United States Patent [19]
Toshimitsu

[11] Patent Number: 5,144,478
[45] Date of Patent: Sep. 1, 1992

[54] MICROSCOPE INCLUDING FIRST AND SECOND STAGES IN CONJUGATE PLANES

[75] Inventor: Kunio Toshimitsu, Yokohama, Japan
[73] Assignee: Nikon Corporation, Tokyo, Japan
[21] Appl. No.: 705,944
[22] Filed: May 28, 1991
[30] Foreign Application Priority Data
  May 28, 1990 [JP] Japan ................................. 2-138025
[51] Int. Cl.⁵ ..................... G02B 21/06; G02B 21/26; G02B 21/36
[52] U.S. Cl. .................................... 359/392; 359/363; 359/391; 359/393; 359/380; 359/385; 359/379; 354/79
[58] Field of Search ............... 359/385, 388, 389, 391, 359/363, 368, 392, 393

[56] References Cited
U.S. PATENT DOCUMENTS
4,363,532 12/1982 Weber ................................. 359/388
5,006,872 4/1991 Parker ................................. 359/363

*Primary Examiner*—Jon W. Henry
*Attorney, Agent, or Firm*—Shapiro and Shapiro

[57] ABSTRACT

A microscope includes a first stage for placing a specimen on a first plane, a second stage for placing the specimen on a second plane, an objective lens provided between the first plane and the second plane, the objective lens being provided so that the first plane and the second plane are in conjugate relationship with the objective lens, a Koehler illuminating optical system for supplying an illuminating light beam for illuminating the first plane, the illuminating optical system supplying the illuminating light beam to the second plane through the objective lens when the specimen is placed on the second plane, and an observation system for observing therethrough the image of the specimen formed on a third plane, the observation system being provided with an optical system cooperating with the objective lens to cause the image of the specimen placed on the first plane to be formed on a third plane, or cause the image of the specimen placed on the second plane to be formed on the third plane.

16 Claims, 4 Drawing Sheets

MICROSCOPE INCLUDING FIRST AND SECOND STAGES IN CONJUGATE PLANES

BACKGROUND OF THE INVENTION

1. Field of the Invention

This invention relates to a microscope, and particularly to a microscope which picks up the image of a specimen by a television camera and through which the image is observed.

2. Related Background Art

Usually, a microscope is comprised of a stage on which a specimen is placed, an illuminating optical system for supplying an illuminating light beam for illuminating the specimen placed on the stage toward the specimen, and an observation optical system for observing therethrough the specimen illuminated by the illuminating optical system. In such a microscope, the image of the specimen placed on the stage is observed through an objective lens. Accordingly, the range of the image which can be observed at any given time by means of the objective lens is remarkably limited.

Also, a Koehler illuminating optical system for uniformly illuminating the specimen is widely used as the illuminating optical system of such a microscope. In this Koehler illuminating optical system, when an objective lens is interchanged, the observation field on the specimen changes and therefore, it is necessary to regulate the range of illumination in conformity with the interchange of the objective lens. In the regulation of the range of illumination for that purpose, where use is made of an objective lens of relatively high magnification (e.g. four or more times), the change of the observation field can be accommodated by regulating a field stop or an aperture stop without changing a lens constituting the Koehler illuminating optical system. In contrast, where use is made of an objective lens of relatively low magnification (e.g. smaller than four times), the change of the observation field cannot be accommodated unless the condenser lens of the illuminating optical system is interchanged.

In recent years, the improved chromatic reproducibility and resolving power of television cameras have given rise to increased opportunities to use television cameras for microscopic observation. In such microscopic observation using a television camera, the image of a specimen formed on the imaging plane of an objective lens is further enlarged by a zoom lens and the enlarged image of the specimen is picked up by the television camera, and is displayed on a display device for observation. In the case of an ordinary microscope, the change of observation magnification is effected by the interchange of an objective lens, while in the case of microscopic observation using a television camera and a zoom lens in this manner, the change of observation magnification can be accomplished both by interchanging the objective lens and changing the zoom ratio of the zoom lens. However, again in such a microscope provided with a zoom lens, the specimen is observed through an objective lens and therefore, the range of the specimen which can be observed at any given time is limited. Also, where observation is done by the use of an objective lens of low magnification (smaller than four times), it is necessary to interchange a condenser lens for regulation as in the other prior-art microscopes, and this has been very cumbersome.

SUMMARY OF THE INVENTION

It is an object of the present invention to provide a microscope through which a specimen can be observed at a low magnification without the interchange of a condenser lens.

The microscope according to the present invention is provided with a second stage for supporting a specimen thereon usually on the imaging plane of an objective lens.

The microscope of the present invention is provided with an intermediate optical system for re-imaging the image of the imaging plane of the objective lens as will be described with respect to an embodiment of the present invention, and when a specimen is placed on the second stage, the specimen is observed in conformity with the magnification of the intermediate optical system. Accordingly, if the magnification of this intermediate optical system, like that of the zoom lens of the prior-art microscope, is relatively low, as 0.5–2 times or 0.9–2.25 times, an objective lens of low magnification is not required for observing the image of a specimen of low magnification. Also, the prior-art microscope provided with a television camera, even if the picked-up image of a specimen is displayed fully on the screen of a display device, displays only the image of the specimen in a range limited by the objective lens. Therefore, even if it uses an objective lens of low magnification, it has only been possible to observe the image of the specimen in a narrow range. However, the microscope of the present invention permits a specimen to be observed without the intermediary of an objective lens which limits the observation range of the specimen and therefore it becomes possible to pick up the image of the entire range illuminated through the objective lens by means of a television camera and observe it. This illuminated range is a range enlarged by the magnification of the objective lens and therefore is wider than in the prior art. Accordingly, the image of the specimen in a wider range than in the prior art can be displayed at any given time at a magnification conforming to the magnification of an intermediate magnification changing lens.

The various features and advantages of the invention will be more fully appreciated from the description of the preferred embodiments presented hereinafter.

DESCRIPTION OF THE PREFERRED EMBODIMENTS

Some embodiments of the present invention will hereinafter be described with reference to the drawings.

Figure 1:
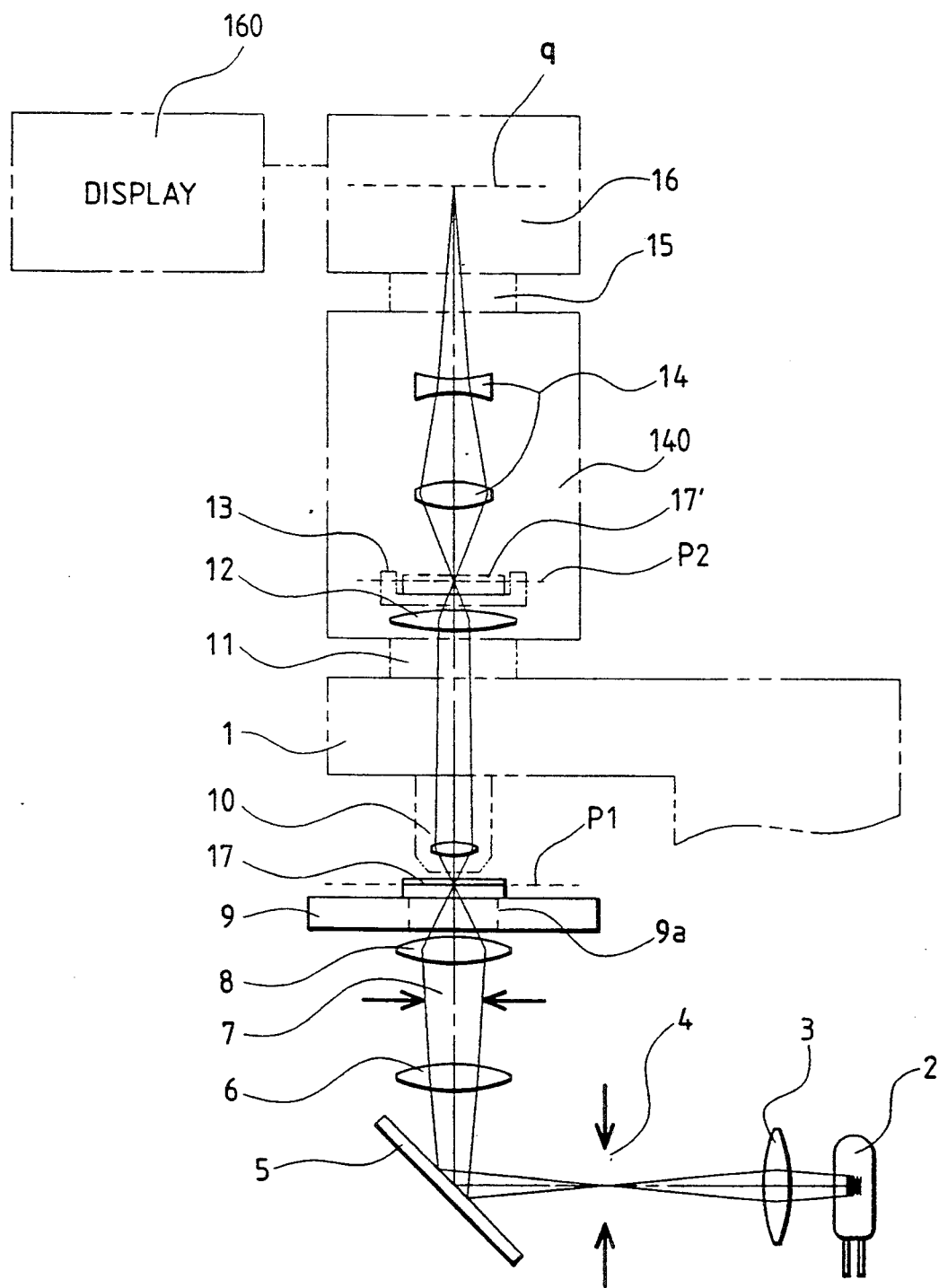
FIG. 1 is an optical path diagram showing the imaging relation of a microscope according to an embodiment of the present invention.

As shown in FIG. 1, an illuminating optical system is formed with a light source 2, a collector lens 3, a field stop 4, a plane reflecting mirror 5, a field lens 6, an aperture stop 7 and a condenser lens 8 disposed in succession along the optical axis thereof. A first stage 9 is formed with a hole 9a for passing therethrough an illuminating light beam from the illuminating optical system. An objective lens 10 is mounted on a conventional revolver (nosepiece), which in turn is mounted on a microscope body 1. An observation optical system comprises a zoom lens adapter 140 and a television camera 16 which will be discussed further hereinafter. The zoom lens adapter 140 is connected to the microscope body 1 through a mount 11. The adapter comprises a converging lens 12, a second stage (only a holder 13 being shown) on which a specimen 17' is placed, and a zoom lens 14 for magnification-changing the image of a specimen 17 placed on the first stage 9 or the image of the specimen 17' placed on the holder 13 and for causing the image to be formed on the image pickup surface q of the television camera 16. The magnification of the zoom lens 14 is 0.5-2 times. Hereinafter, in order to distinguish from the specimen 17 when placed on the first stage 9, the specimen when placed on the second stage is designated as the specimen 17' (indicated by dotted line). The television camera 16 is connected to the zoom lens adapter 140 through a mount 15, and there is further provided a display 160 electrically connected to the television camera 16, and the image pickup element of the television camera 16 is a CCD element having a size of ⅔ inch. The image pickup range of this ⅔ inch CCD is a 6.6 mm long and 8.8 mm wide rectangle having a diagonal length of 11 mm.

Figure 3A:
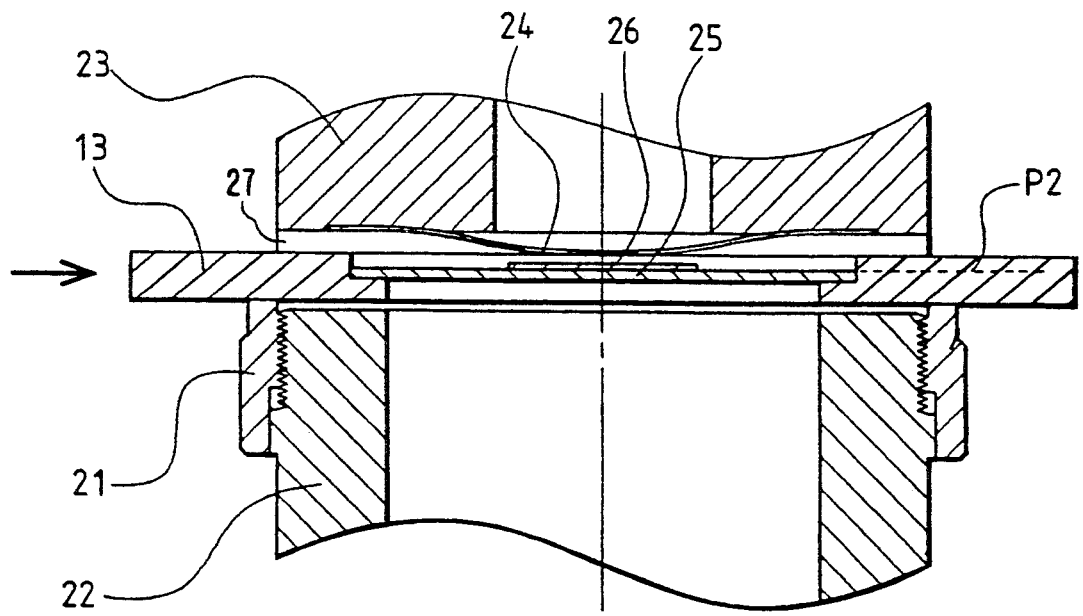
FIG. 3A is an enlarged side sectional view of a second stage.
Figure 3B:
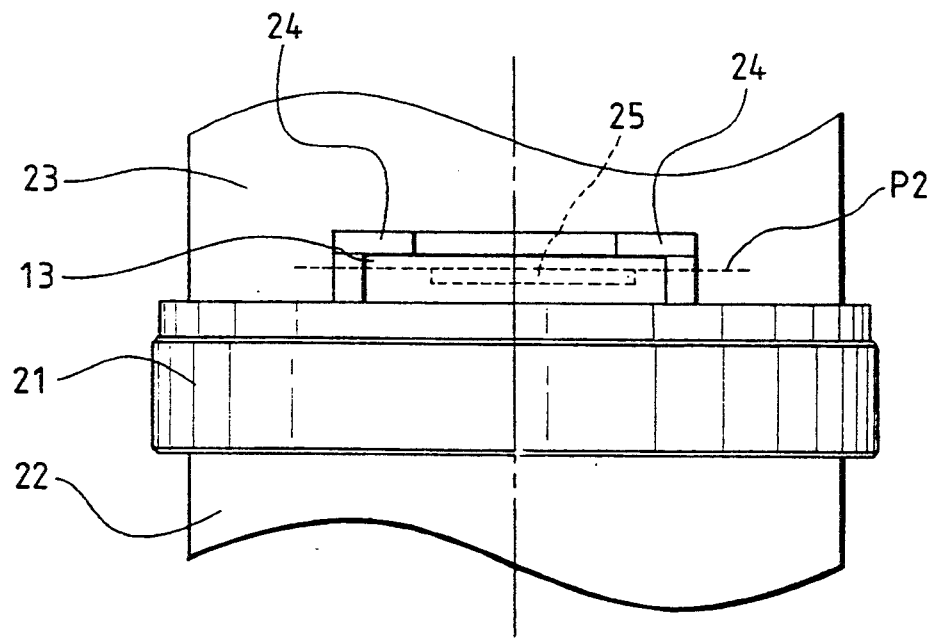
FIG. 3B is a front view of the second stage as it is seen in the direction of the arrow in FIG. 3A.

The second stage, as shown in FIGS. 3A and 3B, is comprised of the holder 13 on which the specimen 17' is placed, a rotatable ring 21 for finely movably holding the holder 13, a lower frame 22, an upper frame 23 and a pair of leaf springs 24, and is provided on the zoom lens adapter 140. The holder 13 has a recess for supporting the specimen substantially centrally of the holder itself, and an aperture for passing the light beam therethrough to the specimen placed in the recess. In such a second stage, after the specimen 17' is placed on the holder 13, the holder 13 is inserted into a slot 27 in the direction of arrow, the slot 27 being formed by the rotatable ring 21, the lower frame 22, the upper frame 23 and the pair of leaf springs 24. When the holder 13 is inserted into the slot 27, the holder 13 is nipped in a vertical direction by the pair of leaf springs 24 and the rotatable ring 21. The leaf springs 24 comprise a pair of right and left leaf springs as shown in FIG. 3B, and are fixed with the holder 13 sandwiched by and between the leaf springs 24 and the rotatable ring 21 so that the leaf springs 24 may not contact with the specimen 17'.

In this microscope, the focusing of the imaging plane of the objective lens 10 with respect to the specimen 17' placed on the second stage is accomplished by fine adjustment using the push-pull of the screws of the rotatable ring 21 and the lower frame 22. Also, the two-dimensional movement of the specimen 17' placed on said imaging plane (the movement of the position on the specimen which is to be observed) is accomplished by manually operating and moving the outwardly protruding portion of the holder 13. During microscopic observation at low magnifications, the specimen can be moved to any position even by the manual operation as previously described. However, where the second stage is electrified or made large, it is preferable that there be a rough and fine moving mechanism.

Figure 2:
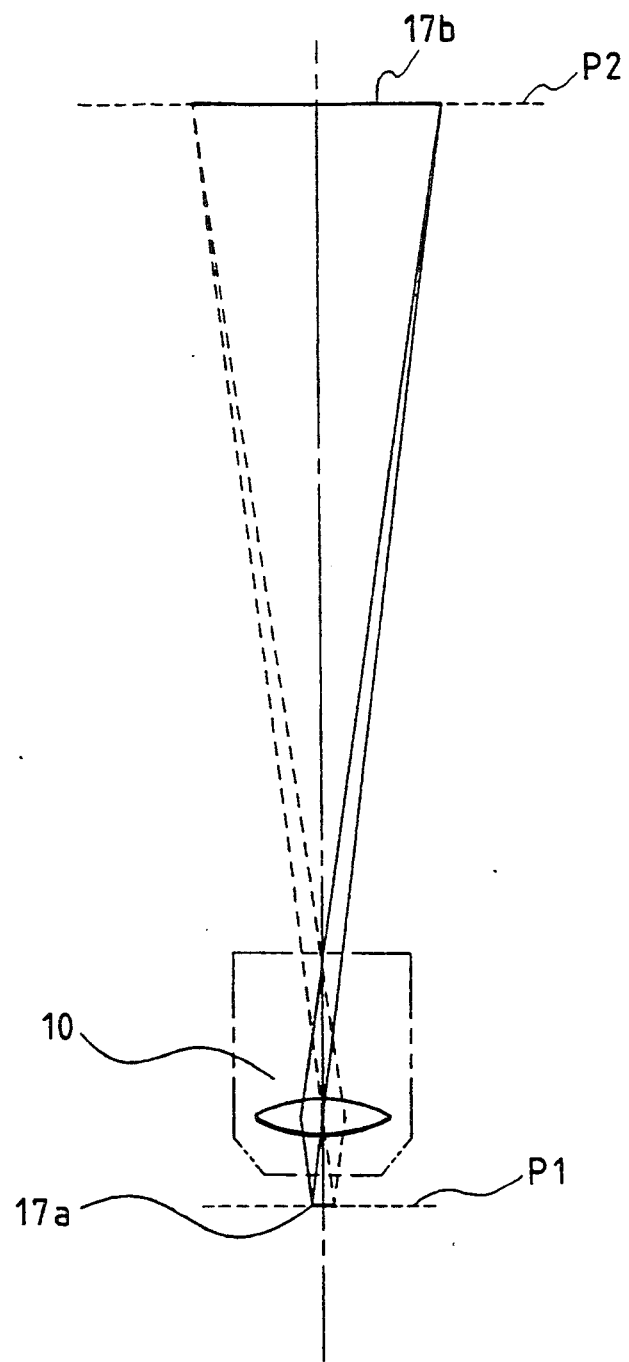
FIG. 2 shows the imaging optical path of an objective lens 10.

A case where the specimen 17 is observed at a high magnification by the use of such a microscope will now be described with reference to FIGS. 1 and 2. First, an objective lens 10 of any magnification is selected and is placed on the optical axis by turning the revolver, and the specimen 17 (indicated by solid line) sandwiched between slide glass and cover glass is placed on the first stage 9. The plane containing the specimen 17 placed on the first stage 9 will hereinafter be referred to as a first plane p1. The illuminating optical system at this time supplies a uniform illuminating light beam to the range 17a (see FIG. 2) of the first plane p1. The image of the specimen in the range 17a illuminated by the illuminating light beam being supplied thereto is formed on the imaging plane of the objective lens 10 by the objective lens 10. At this time, the image of the specimen in the range 17a formed on the imaging plane of the objective lens 10 is the image of the specimen in a range 17b enlarged on the basis of the magnification of the objective lens 10. The imaging plane of this objective lens 10 will hereinafter be referred to as a second plane p2. The image of the specimen in the range 17a is enlarged on the basis of the magnification of the objective lens 10, whereafter it has its magnification changed by the zoom lens 14, and then is re-imaged by the image pickup surface of the television camera 16. The image pickup surface of the television camera 16 will hereinafter be referred to as a third plane q. Finally, the image of the specimen re-imaged on the third plane q is picked up by the television camera 16, and the picked-up image of the specimen is displayed on the display 160.

Description will now be made of a case where the specimen is observed at a low magnification by the use of the microscope of the present embodiment. The specimen 17 placed on the first stage 9 during the earlier described high magnification observation is first removed. The removed specimen 17 (or another specimen) is then placed on the holder 13, whereafter the holder 27 is inserted into the slot 13 in the direction of the arrow in FIG. 3A, whereby the specimen 17 is placed on the second plane p2 which is the imaging plane of the objective lens 10.

The specimen 17' placed on the second plane p2 by being placed on the second stage is illuminated as follows. The illuminating optical system, as during the high magnification observation, supplies an illuminating light beam to the range 17a of the first plane p1 which is near the first stage. During low magnification observation, however, there is no specimen on the first stage and therefore, the illuminating light beam supplied to the range 17a on the first plane p1 illuminates no specimen, but enters the objective lens 10. The objective lens 10 enlarges the incident illuminating light beam in conformity with the magnification of the objective lens 10. Accordingly, the illuminating light beam enlarged to the range 17b by the objective lens 10 is supplied to the second plane p2, and illuminates the range 17b of the specimen 17' placed on the second plane p2. The field stop of the illuminating optical system at this time is adjusted to fully open. Further, speaking from the ideal state of the illuminating optical system, it is better that there are slide glass 25 and cover glass 26 at the specimen supporting position on the stage. However, where the magnification of the objective lens is relatively low (as four to ten times) in the high magnification range, there will be no problem in illumination even if said glass is absent. Also, the illuminating light beam which illuminates the range 17b becomes darker by an amount corresponding to the enlargement thereof by the objective lens, than when the specimen 17 was placed on the first stage 9. This is because the range 17b on the second plane p2 which is the image plane of the objective lens is constant and the magnification of the objective lens is changed by the size of the range 17a being changed. Accordingly, when it is desired to illuminate brightly, it is good to use an objective lens of lowest possible magnification.

The image of the specimen 17' in the range 17b illuminated by the illuminating light beam is magnification-changed by the zoom lens 14, whereafter it is formed on the third plane q which is the image pickup surface of the television camera 15 and the formed image of the specimen is picked up by the television camera 16. Further, the picked-up image of the specimen is displayed on the display 160, whereby the image of the specimen 17' in the range 17b is observed.

The microscope of the present embodiment may be constructed in accordance with the following particulars (which are, of course, merely exemplary): the magnification of the objective lens 10 is ten times, the magnication of the zoom lens 14 is two times at greatest and 0.5 time at smallest, the range 17b of the image of the second plane formed by the objective lens is a circle having a diameter of 22 mm (which is standardized for the reason of design), the image pickup element of the television camera 16 is a ⅔ inch CCD (6.6 mm long and 8.8 mm wide) whose diagonal length is 11 mm, and the display 160 is of 14 inches. With the foregoing construction, when the specimen 17 is placed on the first stage, the image of a range having a diameter of 2.2 mm is increased to 20 times to form an image having a diameter of 44 mm, and in the image having a diameter of 44 mm, the image of a rectangle (whose diagonal length is 11 mm, i.e., ⅔ inch) housed in a circle having a diameter of 11 mm is enlarged to 14 inches (14÷⅔=21 times) and is displayed on the display for observation. That is, the image of a very small range which is the image of a rectangular range housed in a circle having a diameter of 0.55 mm (2.2×¼) is picked up at 10×2 times, and is further enlarged to 21 times for observation. Also, when the magnification of the zoom lens is 0.5 time and the specimen 17' is placed on the second stage for observation (under the same aforementioned conditions), the image of a rectangular range housed in a circle having a diameter of 22 mm is picked up at 0.5 time and is further enlarged to 21 times for observation. Accordingly, when the case where the specimen 17 is placed on the first stage and the case where the specimen 17' is placed on the second stage are compared with each other, the magnification is 10×2×21 in the former case, whereas it is 0.5×21 in the latter case. The range on the specimen observed at any given time is a rectangular range having a diagonal length of 0.55 mm which is housed in a circle having a diameter of 0.55 mm in the former case, whereas it is a rectangular range having a diagonal length of 22 mm which is housed in a circle having a diameter of 22 mm in the latter case. As can be seen from these figures, when observation is done with the specimen placed on the second stage, the specimen in a relatively wide range can be observed at any given time under a relatively low magnification conforming to the zoom lens.

A modification of the microscope of the abovedescribed embodiment will hereinafter be described.

In the microscope of the above-described embodiment, a transmission type Koehler illuminating optical system is used, but alternatively, a reflection type Koehler illuminating optical system may be used. In the case of the reflection type Koehler illuminating optical system, there are provided in the microscope body 1 a half-mirror which downwardly reflects the illuminating light beam from a direction perpendicular to the optical axis and upwardly transmits therethrough the reflected light beam from the first stage including the image of the specimen (when no specimen is on the first stage, only the illuminating light beam), and an illuminating optical system 2, 3, 4, 6, 7 (the objective lens serves also as a condenser lens 8) as shown in FIG. 1 which is formed in the microscope body 1 so that the illuminating light beam therefrom is downwardly reflected by the half-mirror to enter the objective lens. In a microscope using such reflection type illuminating optical system, when observation is to be done with the specimen placed on the second stage, it is necessary to place a mirror-surfaced reflecting mirror on the first stage so that the illuminating light beam from the reflection type illuminating optical system may be reflected on the first stage and enter the objective lens 10.

Figure 4:
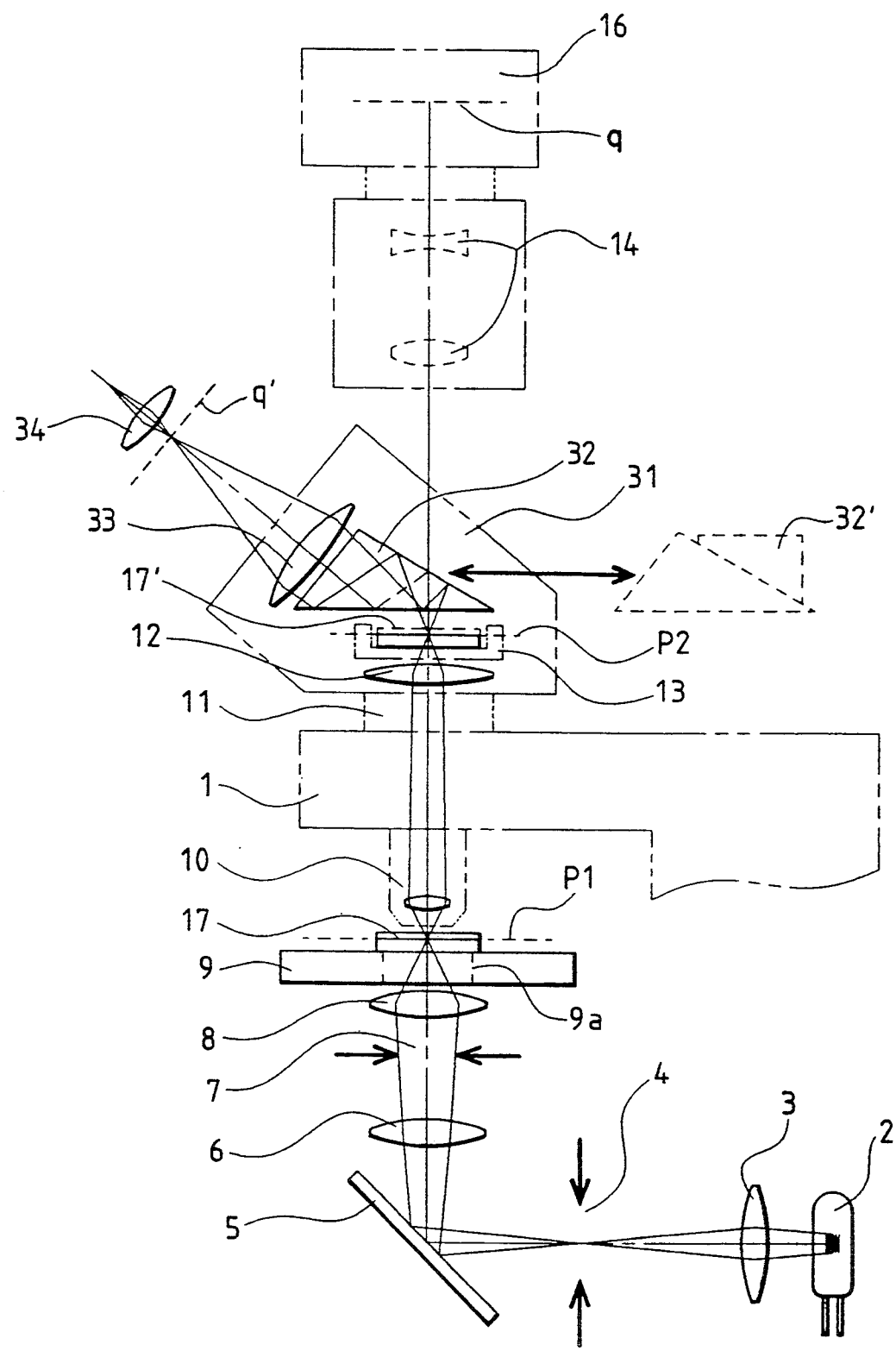
FIG. 4 is an optical path diagram showing the imaging relation of a microscope according to a magnification of the FIG. 1 embodiment.

In the microscope of the above-described embodiments, use is made of an observation optical system through which the specimen is observed by the use of a television camera, but alternatively, use may be made of an observation optical system through which the specimen is observed by the use of an eyepiece. A microscope provided with this observation optical system using an eyepiece, as shown in FIG. 4, is constructed by connecting an observation optical system provided with an eyepiece (hereinafter referred to as the eyepiece unit) through a mount 11. This eyepiece unit is provided with a prism adapter 31 connected to the microscope body 1 through the mount 11 for causing the image of the specimen on the second plane p2 to be formed on the third plane q', and an eyepiece 34 for observing therethrough the image formed on the third plane q'. The prism adapter 31 comprises a second stage (only a holder 13 being shown) similar to that used in the microscope of the earlier-described embodiments, a prism 32 for totally reflecting the image of the specimen 17' placed on the second plane p2 (which is the imaging plane of the objective lens) toward a condensing lens 33, and the condensing lens 33 for condensing the light beam from the prism 32. The microscope provided with this eyepiece unit enables the specimen to be observed at a relatively low magnification which is only the magnification of the eyepiece by the specimen being placed on the second stage.

Further, use can be made of an observation optical system provided with both of such an eyepiece unit and a television camera unit provided with the zoom lens 14 and the television camera 16, as indicated in FIG. 4. The observation optical system in this case may incorporate the observation optical system of the preceding embodiment (comprising a second stage 13, 21, 22, 23, 24 similar to that in the above-described embodiment, a zoom lens 14, a television camera 16 and a display 160, an eyepiece unit comprising a prism 32, a condensing lens 33 and an eyepiece 34) and prism moving means (not shown). The prism moving means moves the prism 32 so as to lie on the optical axis (the position of the prism 32 indicated by solid line) when the image of the specimen is to be observed through the eyepiece 34, and so as to be off the optical axis when the specimen is to be observed on the display 160, in order to change over these two cases. Such prism moving means is comprised, for example, of a guide provided on a plane parallel to the second plane p2 for holding the prism 32 in such a manner as to sandwich the prism from the opposite sides thereof, and a motor for moving the guide in a direction parallel to the second plane. However, instead of the prism 32, use may be made of a half-transmission prism which divides the light beam from the second plane portions $n_i$: $m$ ($n+m=1$), and in such case, use is made of a half-transmission prism 32' (indicated by dotted line) provided with an optical member for correcting the deviation of the optical axis of the image picked up by the television camera. Where such half-transmission prism 32' is used, the image of the specimen can be observed at the same time through the eyepiece 34 and the display 160 and therefore, the prism moving means may be eliminated. Also, the prism 32 and 32' may be changed over by the use of prism moving means.

In the microscope of the above-described embodiment, use is made of the television camera 16 having the display 160 attached thereto, but alternatively, observation may be made by the use of a camera which prints the image of the specimen on film.

I claim:

1. A microscope including:
   a first stage for placing a specimen on a first plane;
   a second stage for placing said specimen on a second plane;
   a first optical system including an objective lens and being provided between said first plane and said second plane so that said first plane and said second plane are in conjugate relationship with respect to said first optical system;
   a Koehler illuminating optical system for supplying an illuminating light beam for illuminating said first plane, said illuminating optical system supplying said illuminating light beam to said second plane through said first optical system when the specimen is placed on said second plane; and
   observation means for observing therethrough the image of the specimen formed on a third plane, said observation means being provided with a second optical system to cause the image of the specimen placed on said first plane to be formed on said third plane by cooperation with said first optical system, or cause the image of the specimen placed on said second plane to be formed on said third plane.

2. A microscope according to claim 1, wherein said second stage includes a holder on which the specimen is placed, and holder holding means for holding said holder so as to place the specimen on said second plane.

3. A microscope according to claim 2, wherein said holder holding means holds said holder so that said holder is two-dimensionally finely movable along said second plane.

4. A microscope according to claim 3, wherein said holder holding means has means for moving said holder in a direction perpendicular to said second plane.

5. A microscope according to claim 1, wherein said second optical system has a zoom lens.

6. A microscope according to claim 5, wherein said observation means includes image pickup means for picking up the image of the specimen formed on said third plane.

7. A microscope according to claim 6, wherein said image pickup means comprises a television camera for picking up the image of the specimen formed on said third plane.

8. A microscope according to claim 7, having display means for displaying the image picked up by said television camera.

9. A microscope according to claim 1, wherein said observation means includes an eyepiece for observing therethrough the image of the specimen formed on said third plane.

10. A microscope according to claim 1, wherein said observation means includes means for observing the image of the specimen formed on a fourth plane, said second optical system is operable to cause the image of the specimen placed on said first plane to be formed on said fourth plane by cooperation with said first optical system and to cause the image of the specimen placed on said second plane to be formed on said fourth plane, and said observation means includes image pickup means for picking up the image of the specimen formed on said third plane and an eyepiece for viewing the image of the specimen formed on said fourth plane.

11. A microscope according to claim 10, wherein said second optical system causes the image of the specimen to be formed on said third plane and said fourth plane simultaneously.

12. A microscope according to claim 10, wherein said second optical system includes an optical element which is shiftable to cause the image of the specimen to be formed selectively on said third plane and said fourth plane.

13. A microscope including:
   a first stage for placing a specimen on a first plane;
   a second stage for placing the specimen on a second plane;
   a first optical system including an objective lens and being provided between said first plane and said second plane so that said first plane and said second plane are in conjugate relationship with respect to said first optical system;
   an illuminating optical system for illuminating the specimen; and
   observation means including an imaging lens for observing therethrough the image of the specimen formed on a third plane;
   wherein when the specimen is on said first plane, said illuminating optical system illuminates the specimen and said first optical system and said observation means form the image of the specimen on said third plane, and when the specimen is on said second plane, said illuminating optical system and said first optical system illuminate the specimen and said observation means forms the image of the specimen on said third plane.

14. A microscope according to claim 13, wherein said observation means is operable to form the image of the specimen on a fourth plane when the specimen is on said first plane and when the specimen is on said second plane, and said observation means includes image pickup means for picking up the image of the specimen formed on said third plane and an eyepiece for viewing the image of the specimen formed on said fourth plane.

15. A microscope according to claim 14, wherein said observation means forms the image of the specimen on said third plane and said fourth plane simultaneously.

16. A microscope according to claim 14, wherein said observation means includes an optical element which is shiftable to cause the image of the specimen to be formed selectively on said third plane and said fourth plane.

* * * * *